(12) United States Patent
Clark et al.

(10) Patent No.: US 6,422,514 B1
(45) Date of Patent: Jul. 23, 2002

(54) COMMON BULKHEAD CRYOGENIC PROPELLANT TANK

(75) Inventors: William James Clark, Valencia, CA (US); Robert John Wetherall, Benbrook, TX (US)

(73) Assignee: Lockheed Martin Corportation, Farmdale, CA (US)

( * ) Notice: Subject to any disclaimer, the term of this patent is extended or adjusted under 35 U.S.C. 154(b) by 0 days.

(21) Appl. No.: 09/626,251

(22) Filed: Jul. 26, 2000

(51) Int. Cl.$^7$ ................................................. B64G 1/00
(52) U.S. Cl. ............... 244/135 R; 244/172; 244/135 R; 220/901
(58) Field of Search .............................. 244/158 R, 172, 244/135 R; 220/901

(56) References Cited

U.S. PATENT DOCUMENTS

| | | | | |
|---|---|---|---|---|
| 4,615,452 A | * | 10/1986 | Lederer | 220/1 B |
| 5,085,343 A | * | 2/1992 | Scarr | 220/445 |
| 5,568,901 A | * | 10/1996 | Stiennon | 244/172 |
| 5,984,235 A | * | 11/1999 | Snowhook | 244/172 |
| 6,036,144 A | * | 3/2000 | Sisk | 244/172 |
| 6,082,676 A | * | 7/2000 | Cochran | 244/158 R |

* cited by examiner

Primary Examiner—J. Woodrow Eldred
(74) Attorney, Agent, or Firm—Robert A. Schurhl

(57) ABSTRACT

The present invention discloses a novel fuel structure for housing and delivering disparate cryogenic fuels to combustion zones in an aerospace vehicle. The tank comprises a plurality of containers having volumes that are separated by common wall bulkheads and which are arranged substantially side-by-side in conformance with the interior of the aerospace vehicle. A tank support structure positioned within the vehicle interior includes lengthwise supports as well as cross-wise supports, with the latter including openings within which the rear ends of the containers are supported. Fuel from the containers is delivered to the vehicle's combustion system via appropriate fuel lines carried by dome shaped end caps at the rear ends of the containers.

9 Claims, 3 Drawing Sheets

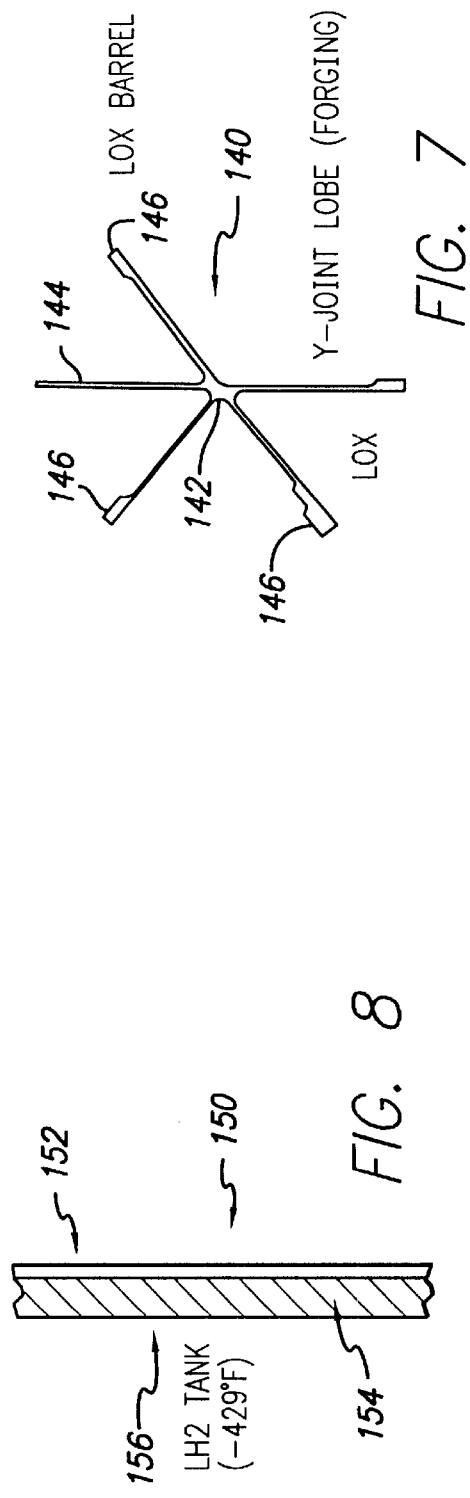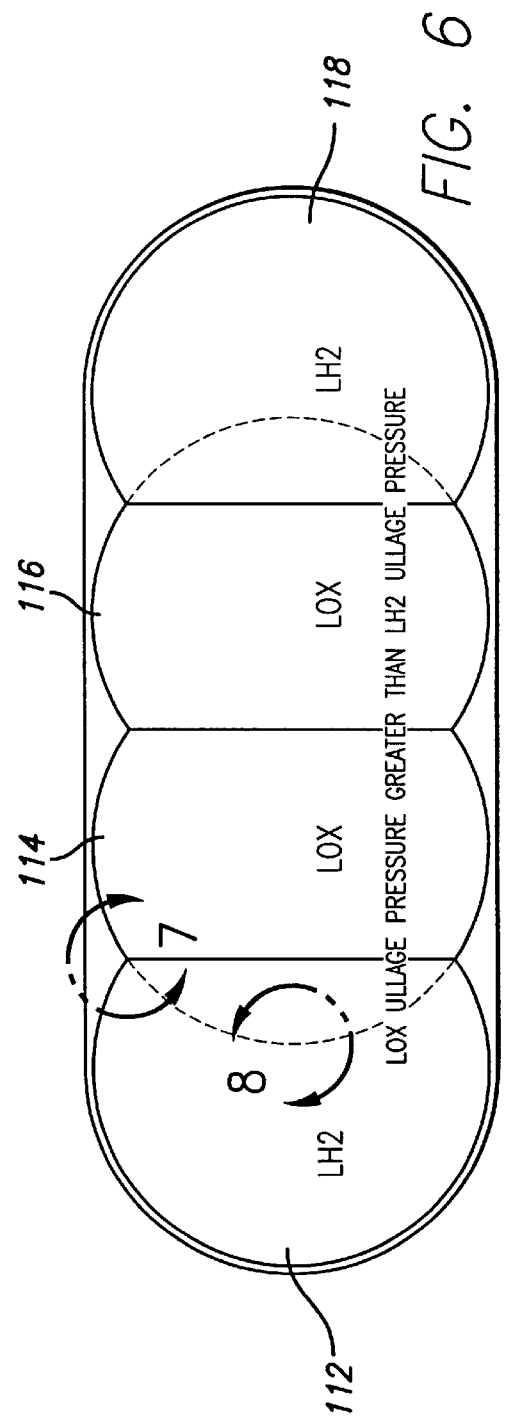

US 6,422,514 B1

COMMON BULKHEAD CRYOGENIC PROPELLANT TANK

The invention described herein was made in the performance of work under NASA Contract No. NCC8-115 and is subject to provisions of Section 305 of the National Aeronautics and Space Act of 1958 (42 U.S.C. 2457).

BACKGROUND OF THE INVENTION

1. Field of the Invention

The present invention relates to cryogenic propellant fuel tanks for air vehicles, and more particularly to a cryogenic propellant tank structure including multiple contiguous fuel containers having an overall configuration that conforms to the interior of the air vehicle, adjacent fuel containers sharing a common bulkhead structure.

2. Description of the Related Art

It is now well-known that in order to achieve a single stage to orbit reusable launch vehicle ("SSTO-RLV"), it is necessary to attain an extremely low vehicle mass fraction. "Mass fraction" is a term that commonly refers to the ratio of the dry weight of a vehicle to the gross lift-off weight of the same vehicle.

Various configurations of aerospace vehicles have been proposed to achieve such an objective. For example, the prior art teaches traditional SSTO configurations of the type typically used in the NASA's space shuttle program. These vehicles use external expendable drop fuel tanks, and examples are shown in U.S. Pat. No. 3,929,306 to Faget et al, U.S. Pat. No. 4,452,412 to von Pragenau, U.S. Pat. No. 4,557,444 to Jackson et al., and U.S. Pat. No. 4,817,890 to Coffinberry. SSTO vehicles which do not use expendable fuel tanks are also known, as evidenced by the teachings of U.S. Pat. No. 3,261,571 to Pinnes, U.S. Pat. No. 3,955,784 to Salkeld, and U.S. Pat. No. 5,975,466 to Kahara et al. In the Pinnes patent, the fuselage of an aircraft intended for orbital flight comprises a plurality of cryogenic fuel tanks arranged in a triangular configuration and secured together to form the fuselage of the craft. In the Kahara et al. patent, the aircraft disclosed includes a fuel tank, which takes the form of a collapsible bladder. And in the Salkeld patent, there is disclosed an aerospace vehicle which incorporates two different propulsion systems that are operated in sequence and which use cryogenic fuels stored in tanks within the body of the vehicle.

Against this background of known technology, the applicants have developed a novel fuel tank structure for housing and delivering disparate cryogenic fuels to combustion zones in an aerospace vehicle. The tank comprises a plurality of containers having volumes that are separated by common wall bulkheads and which are arranged substantially side-by-side in conformance with the interior of the aerospace vehicle. A tank support structure positioned within the vehicle interior includes lengthwise supports as well as cross-wise supports, with the latter including openings within which the rear ends of the containers are supported. Fuel from the containers is delivered to the vehicle's combustion system via appropriate fuel lines carried by dome shaped end caps at the rear ends of the containers.

OBJECTS AND SUMMARY OF THE INVENTION

It is therefore an object of the present invention to provide a novel cryogenic fuel tank for an aerospace vehicle that will provide an extremely low vehicle mass fraction, while overcoming many of the disadvantages and drawbacks of similar fuel tanks known in the art.

Another object of the present invention is to provide a fuel tank for cryogenic propellants, which conform to the interior space of an air vehicle in which the tank is located.

Still another object of the invention is to provide one fuel tank within another fuel tank, the two tanks holding disparate cryogenic fuels, which are intended to be mixed before being combusted.

Yet another object of the invention is to provide a novel cryogenic propellant tank in which the overall configuration of the tank is a deltoid shape.

These and other objects, advantages and features of the invention will become more apparent, as will equivalent structures which are intended to be covered herein, with the teaching of the principles of the invention in connection with the disclosure of the preferred embodiments thereof in the specification, claims and drawings in which:

BRIEF DESCRIPTION OF THE DRAWINGS

FIG. 6 is a cross section through the rear portion of the fuel tank;

FIG. 7 is a Y-joint member depicted in view A—A in FIG. 6; and

FIG. 8 is a cross-section of the fuel tank wall shown in view B—B of FIG. 6.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a cryogenic fuel tank having multiple fuel chambers for diverse propellants wherein one set of tank chambers is substantially contained within another set of chambers, and all chambers are arranged substantially conformally within the interior of an aerospace vehicle.

The present invention comprises a multi-chamber fuel tank 100 for holding diverse cryogenic propellants. Preferably, the propellant tank 100 possesses a deltoid shape and is designed to be arranged within, and substantially in conformance with, the interior volume of an aerospace vehicle.

The propellant tank is a multi-lobed pressure cylinder design that integrates near conformally with the interior volume of an aerospace vehicle. This acts to maximize the propellant volumetric efficiency of the fuselage. The design is comprised of a four lobed pressure cylinder, triangular shaped LH2 tank that incorporates a two lobed LOX tank partitioned by a common tank wall in the center of the two lobes (see FIGS. 1 and 3–5).

Figure 1:
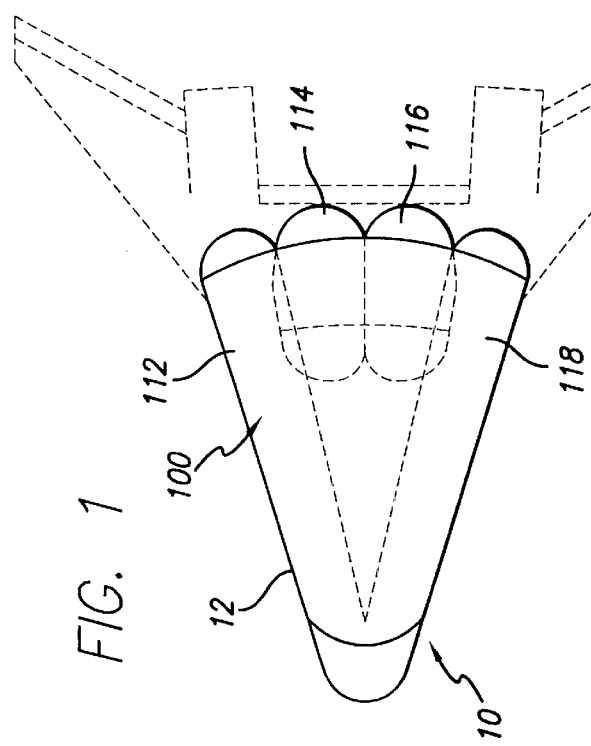
FIG. 1 depicts the propellant tank 10 conformally disposed in an aerospace vehicle (the latter being shown in phantom lines)

Referring to FIG. 1, it can be seen that the aerospace vehicle 10 possesses a deltoid shaped body portion 12 within which the tank 100 is conformally contained. The tank 100 preferably comprises a plurality of containers or chambers 112, 114, 116, 118 within which it is intended that diverse propellants will be contained. In the embodiment of the invention depicted in FIG. 1, a first pair of the chambers 112 and 118 are arranged parallel to the sides of the body portion of the aerospace vehicle 10, and are connected together at a forward end portion thereof, but are spaced apart at a rearward portion thereof. The interior chambers 114 and 116 are of a shorter length than the first pair of chambers and are disposed between the first pair of chambers at the rearward end portions of the first pair of chambers. Preferably, a first propellant (such as liquid hydrogen) would be held in the first pair of chambers 112, 118, while a second propellant (such as liquid oxygen) would be contained in the interior chambers 114, 116.

Figure 2A:
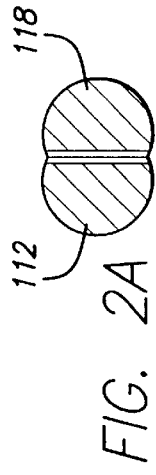
FIGS. 2A–2D depict the cross-sections of the aerospace vehicle shown in FIG. 1 taken along section lines A—A, B—B, C—C and D—D, respectively.
Figure 2B:
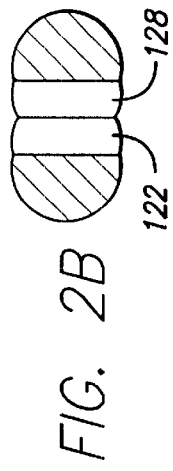
Figure 2C:
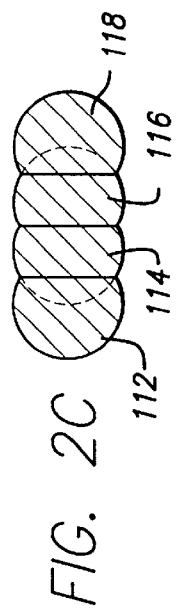
Figure 2D:
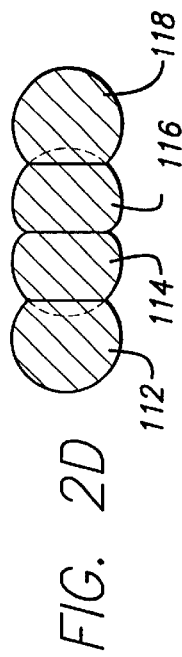
Figure 2:
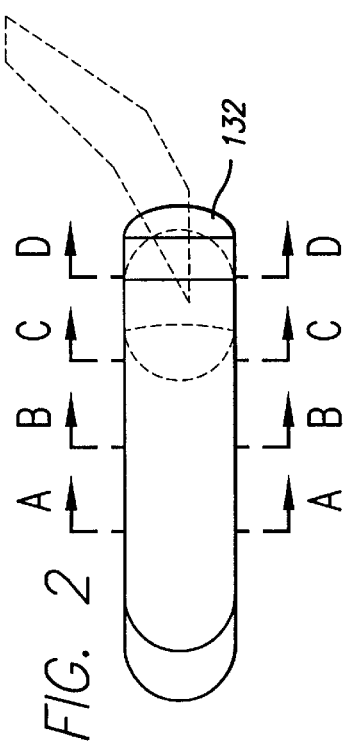
FIG. 2 is a cross-sectional view of the aerospace vehicle shown in FIG. 1.

FIG. 2 is a side view of the aerospace vehicle 10 depicted in FIG. 1 showing that the chambers of the fuel tank 100 extend substantially the entire length of the vehicle body, and that the interior chambers are shorter in length than the exterior chambers.

FIGS. 2A–2D show cross-sections of the vehicle body along the length of the vehicle taken along section lines A—A, B—B, C—C, and D—D, respectively. FIG. 2A is a section taken at a forward region of the vehicle body, and shows that only the exterior chambers 112 and 118 are present. FIG. 2B is a section taken more rearwardly, and shows that the exterior chambers 112, 118 are beginning to diverge with facing surfaces 122, 128 being separated due to being arranged at an angle to one another. FIG. 2C is a section taken even more rearwardly and shows the two exterior chambers 112, 118 and the forward region of the interior chambers 114, 116 disposed between the exterior chambers. FIG. 2D is a section taken at the rearward region of the vehicle body, and shows that the four tank chambers are well defined. Preferably, all chambers exhibit at their rearward ends a dome-shaped closure 132 (see the discussion of FIGS. 3–5 below).

Figure 5:
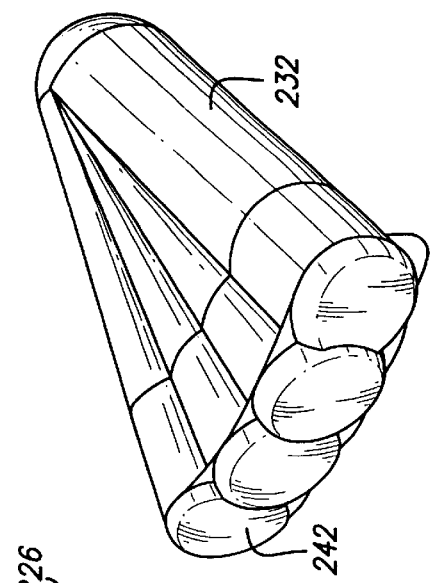
FIGS. 3–5 show structural framework for supporting the cryogenic propellant fuel tank in the aerospace vehicle.
Figure 4:
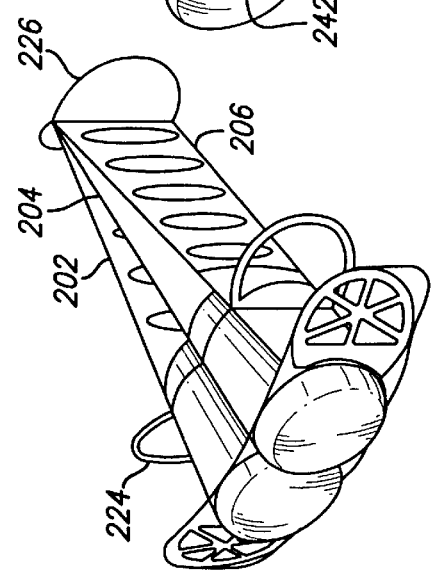
Figure 3:
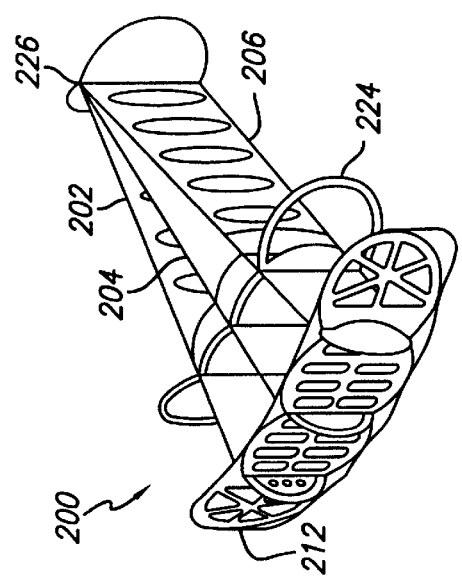

FIGS. 3–5 show the structural framework 200 used with the tank 100 for the purpose of supporting the chembers of the tank within the interior of the aerospace vehicle 10. As seen, the framework includes outer panel-like members or septums 202, 206 and an inner panel-like member or septum 204. These septums extend along the length of the aerospace vehicle from front to rear. At the rear of the septums is a curvilinear bulkhead 212, which extends across the rearward ends of the septums. A bit forwardly of the bulkhead 212 is a first dome-ring member 224 that extends across the septums. The first dome ring member has four circular elements each having a circular opening therethrough for supporting the forward domes of propellant chamber 114, 116. At the forward end of the septums is a second dome-ring 226 which also exhibits circular elements (two) having openings therethrough for receiving and supporting the forward ends of the exterior propellant chambers 112 and 118. As seen in FIGS. 4 and 5, orthogrid skin panels 232 are welded between the bulkhead 212 and the dome ring member 224, as well as between the dome ring member 224 and the second dome ring member 226. Conical dome caps 242 are welded onto the rearward end of the bulkhead 212, the forward interior end of the dome ring member 224, and the forward end of the second dome ring member 226 to close the propellant chambers.

FIG. 6 is an enlarged view of the cross-section shown in FIG. 2D depicting a first region A—A (shown in greater detail in FIG. 7) where the interior and exterior propellant tanks 112, 114 "intersect" and a second region B—B (shown in greater detail in FIG. 8) taken along the "line" of intersection of the interior propellant tank 114 and the exterior propellant tank 112.

The region A—A is shown enlarged in FIG. 7, and it can be seen that a Y-joint structural interconnector 140 has been provided for attaching together the adjacent interior and exterior tanks shown in FIG. 6. The interior and exterior propellant tanks 112, 114 are arranged side-by-side and are attached together at upper and lower points of intersection with the aid of the Y-joint connector 140. The connector 140 has a central hub 142 and five legs 144 extending from the central hub. Each of the legs includes an enlarged portion or land 146 at the region most removed from the central hub. The enlarged portion of the leg acts as a welding land to facilitate secure attachment of the tank container skin 150.

The region B—B is shown enlarged in FIG. 8 where the preferred construction of the wall or skin 150 of the tank is depicted. The skin 150 comprises a multi-layered structure including a common wall bulkhead 152, a layer of reusable cryogenic insulation 154 attached the bulkhead, and a thin sheet liner 156 disposed over the layer of insulation.

The skin of the container is made of integrally machined orthogrid stiffened panels bump formed to contour. Panel sections are welded together to form each barrel section. Each barrel section is welded to one land of the Y-joint interconnector shown in FIG. 4. The downstanding leg of the cruciform is used to attach tension septums the full length of the tank.

Conical dome sections 132 welded to the aft and forward ends of the chambers incorporate manifolds for propellant feeds, pressurization and fill/drain lines. An internal aft bulkhead is required to react wing bending/torsion loads, main landing gear loads, and engine thrust loads. The orthogrid skin panels provide the necessary stiffness to react vehicle air loads.

The tank chambers 112, 114, 116, 118 are constructed from Aluminum 2219 which has the required material properties (high strength and toughness, with no permeability) at cryogenic temperatures. The common tank walls are required to minimize tank surface area (i.e., weight) to achieve the low mass-fraction requirement for an SSTO-RLV. The common walls provide isolation of LH2 and LOX. To maintain the structural integrity of the tank(s), a positive pressure differential is required at all times (LOX design ullage pressure greater than LH2 design ullage pressure). Due to the explosive combustion of the propellants, zero defect, zero leak welds are required at the common wall. Friction stir weld technology is a demonstrated engineering solution for leak free welds.

Thermal isolation of the two propellants is required to maintain the fuel densities (i.e., to prevent LOX freezing) and minimize different material strains from the propellants at different temperatures (LOX @ −338 degrees F. and LH2 @ −429 degrees F.). Cryogenic insulation is machined to fill the pockets of the orthogrid panels and then bonded in place. The insulation is secured with a thin sheet panel attached to the orthogrid panel. The common bulkhead tank is pressure stabilized to minimize tank weight.

The propellant fuel tank of this invention has been designed to react all vehicle loads, and in so doing, it eliminates the requirement for an intertank structure to transfer inertial LOX loads to a hydrogen tank (common in rocket tank designs). The aft located LOX tank eliminates structural weight associated with a column support of a large inertial mass (i.e., forward LOX design). The tension septums provide hardpoints for the attachment of payload and landing gear, as well as a redundant shear load path for reacting vehicle inertial and air loads. The aft tank domes minimize the duct lengths of the main propellant system. Subsystem routing from the front to the back of the vehicle is accommodated within the three cusps at the tank lobe intersections.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What we claim is:

1. A cryogenic propellant fuel tank for a single stage to orbit aircraft, said fuel tank comprising:

a propellant container comprising a plurality of chambers for holding first and second cryogenic propellants, the chambers being separated from one another by a common bulkhead, said container having a forward and rearward portions, the width of the rearward portion being greater than the width of the forward portion, and structural support means for securing said container within the aircraft.

2. The fuel tank of claim 1, wherein said container exhibits a triangular peripheral shape and said plurality of chambers are disposed essentially side-by-side.

3. The fuel tank of claim 2, wherein said plurality of chambers comprises at least one inner chamber disposed between two outer chambers, said inner chamber having a length substantially less than the length of said outer chambers.

4. The fuel tank of claim 3, wherein said at least one inner chamber comprises two inner chambers.

5. The fuel tank of claim 3, wherein said inner and outer chambers are arranged adjacent to one another and are secured together via Y-joint connectors.

6. The fuel tank of claim 5, and further including skin panels wherein said chambers are defined by said skin panels.

7. The fuel tank of claim 6, wherein said structural support means for supporting said chambers of said fuel tank within an aerospace vehicle includes a first curvilinear element extending across the width of the rear end of said fuel tank, and second elements extending from the rear end of said fuel tank toward the forward end of said fuel tank, said skin panels being attached to said first and second elements elements of said structural support means.

8. The fuel tank of claim 7, wherein said first element includes openings of a size large enough to define the rear ends of said chambers.

9. The fuel tank of claim 7, wherein conical end caps are secured to the rear of said first element.

* * * * *